(12) United States Patent
Falstrup et al.

(10) Patent No.: US 10,325,405 B1
(45) Date of Patent: Jun. 18, 2019

(54) SOCIAL MEDIA SHARING IN A VIRTUAL REALITY APPLICATION

(71) Applicant: Relay Cars LLC, Rancho Dominguez, CA (US)

(72) Inventors: David Falstrup, Rancho Dominguez, CA (US); Thom Denick, Rancho Dominguez, CA (US); Alex McClain, Rancho Dominguez, CA (US); Ryan Murray, Rancho Dominguez, CA (US); Claudia Nefately Ambriz, Rancho Dominguez, CA (US); Pat Hadnagy, Los Angeles, CA (US)

(73) Assignee: Relay Cars LLC, Rancho Dominguez, CA (US)

( * ) Notice: Subject to any disclaimer, the term of this patent is extended or adjusted under 35 U.S.C. 154(b) by 213 days.

(21) Appl. No.: 15/481,232

(22) Filed: Apr. 6, 2017

Related U.S. Application Data (60) Provisional application No. 62/320,367, filed on Apr. 8, 2016.

(51) Int. Cl.

| | |
|---|---|
| *G06T 3/40* | (2006.01) |
| *G06T 19/00* | (2011.01) |
| *G06T 11/60* | (2006.01) |
| *G06F 3/0488* | (2013.01) |
| *G06F 3/0482* | (2013.01) |
| *G06F 3/0484* | (2013.01) |
| *G06Q 50/00* | (2012.01) |

(52) U.S. Cl.
CPC .......... *G06T 19/003* (2013.01); *G06F 3/0482* (2013.01); *G06F 3/0484* (2013.01); *G06F 3/04886* (2013.01); *G06T 3/4038* (2013.01); *G06T 11/60* (2013.01); *G06Q 50/01* (2013.01); *G06T 2200/24* (2013.01)

(58) Field of Classification Search
CPC ..... G06T 19/003; G06T 3/4038; G06T 11/60; G06T 2200/24; G06F 3/0482; G06F 3/0484; G06F 3/04886; G06Q 50/00; G06Q 50/01
See application file for complete search history.

(56) References Cited

U.S. PATENT DOCUMENTS

| | | |
|---|---|---|
| 9,135,754 B2 | 9/2015 | Ng-Thow-Hing et al. |
| 9,367,950 B1 | 6/2016 | Scranton et al. |
| 2014/0280644 A1 | 9/2014 | Cronin |
| 2015/0124051 A1 | 5/2015 | Schinker |

FOREIGN PATENT DOCUMENTS

| | | |
|---|---|---|
| WO | WO2015183887 | 12/2015 |
| WO | WO2015200732 | 12/2015 |
| WO | WO2016130935 | 8/2016 |
| WO | WO20161822504 | 11/2016 |

*Primary Examiner* — Rinna Yi
(74) *Attorney, Agent, or Firm* — Socal IP Law Group LLP; Mark Andrew Goldstein (57) ABSTRACT

A method which allows a user who is viewing panoramic images within a virtual reality (VR) head mounted device to share with a social media network pre-loaded images of the content being viewed and post a comment. Specifically, this invention will allow a user to share an image of a vehicle just viewed or currently being viewed by the user and upload a comment in regards to the vehicle while still maintaining the integrity of the virtual reality experience.

3 Claims, 9 Drawing Sheets

SOCIAL MEDIA SHARING IN A VIRTUAL REALITY APPLICATION

CROSS-REFERENCE TO RELATED APPLICATION

This patent application claims priority to Provisional Application Ser. No. 62/320,367 filed on Apr. 8, 2016.

BACKGROUND OF THE INVENTION

1. Field of the Invention

The present invention relates to the field of photography and virtual reality. In particular, the present invention is in the field of enabling a user to share content with a social media account or network while viewing the interior and exterior of a vehicle within a virtual reality setting.

2. Description of the Prior Art

The following 8 patents and published patent applications are the closest prior art references known to the inventors.

1. United States Published Patent Application No. 2014/0280644 by applicant John Cronin on Sep. 18, 2014 for "Real Time Unified Communications Interaction Of A Predefined Location In A Virtual Reality Location".

2. United States Published Patent Application No. 2015/0124051 by applicant to Robert Schinker on May 7, 2015 for "Methods And Apparatus For Enhanced Reality Messaging".

3. U.S. Pat. No. 9,135,754 issued to Ng-Thow-Hing et al on Sep. 15, 2015 for "Method To Generate Virtual Display Surfaces From Video Imagery Of Road Based Scenery".

4. International Application No. WO 2015/183887 by applicant Chase, Stephen on Dec. 3, 2015, for "Video Headphones, Systems, Helmets, Methods And Video Content Files".

5. International Application No. WO 2015/200732 by applicant Imagine Universe, Inc. on Dec. 30, 2015 for "User Interface Using Tagged Media, 3d Indexed Virtual Reality Images, And Global Positioning System Locations, For Electronic Commerce".

6. U.S. Pat. No. 9,367,950 issued to Scranton et al on Jun. 14, 2016 for "Providing Virtual Reality Experiences Based On Three-Dimensional Designs Produced Using Three-Dimensional Design Software".

7. International Application No. WO 2016/130935 by applicant Harvey, Gregory Lawrence on Aug. 18, 2016 for "System And Method To Integrate Content In Real Time Into A Dynamic 3-Dimensional Scene".

8. International Application No. WO 2016/182504 by applicant Chow, Bryan Shwo-kang on Nov. 17, 2016, for "A Virtual Reality Headset".

SUMMARY OF THE INVENTION

The present invention is an apparatus and method which allows a user who is viewing panoramic images within a virtual reality (VR) head mounted device to share with a social media network pre-loaded images of the content being viewed and post a comment.

Specifically, this invention will allow a user to share an image of a vehicle just viewed or currently being viewed by the user and upload a comment with regard to the vehicle while still maintaining the integrity of the virtual reality experience.

It is an object of the present invention to create a method to allow a user to connect to the user's social account by using a virtual keyboard to enter account user name and password and then the application sends this information for verification and once verified, allows the user to share images (with or without custom commentary) from within the application.

It is a further object of the present invention to provide a secondary application to connect to a user's social account in Facebook® and Twitter® to the device using the VR application (Samsung GearVR, Oculus Rift, etc.) via third party application.

It is a further object of the present invention to provide an application that allows communication through the following key processes with a social sharing network while within a VR setting:

1. Providing the user a Call To Action ("CTA") to connect their social accounts to the application. This CTA can appear at the start of the application (app), or show up when the user attempts to share content via a share icon CTA or some other user interface (UI) indicator.

2. The user enters the user's login information for their social account, typically their e-mail address. The VR application sends this information to a separate application, that allows the user to confirm their account as well as connect to their Facebook® and Twitter® accounts.

3. The user's account information is shared in a database associated with the device used to access the VR application, so that when the user returns to the app, they can share at will without having to reconnect their social accounts to the application.

4. When the user enters a VR experience, the app checks to see if the user's previously entered email account is associated with a Facebook® or Twitter® account.

5. Once confirmed, upon clicking the share icon in the application, the user is shown the image to be shared, allowed to select which social network to share on and allowed the option to enter a customized comment with the image.

Defined in detail, the present invention is a method comprising the steps of: (a) creating computer generated images of a virtual reality setting to form six faces of a cube and creating two identical cubes from said six faces, placing together two inverted cubes to form a skybox; (b) obtaining a multiplicity of panoramic images of interiors of a multiplicity of selected vehicles and a multiplicity of panoramic images of exteriors of said multiplicity of selected vehicles; (c) placing a specific one of said panoramic images of a selected vehicle from either said multiplicity of panoramic images of interiors and multiplicity of panoramic images of exteriors within said skybox; (d) placing a sharing graphic user interface in said skybox that opens a socialize virtual dialog box having a socialize display text, a set up graphic user interface, and a not now graphic user interface when selected by a user; (e) said set up graphic user interface connected to a keyboard virtual dialog box with a virtual keyboard that allows the user to enter there email address to connect to a users social network account; (f) said not now graphic user interface closing said socialize virtual dialog box when selected; (g) a database that stores user names, user email addresses, upload dates, and answers to boolean queries; and (h) a to-be-shared dialog box having a to-be-shared image, an experience display text, and a custom text graphic user interface; (i) whereby, said user shares with a social media network a to-be-shared image and a comment entered into said custom text graphic user interface for other users of said social media network to view.

Defined more broadly, the present invention is a method comprising the steps of: (a) creating computer generated images of a virtual reality setting to form six faces of a cube and creating two identical cubes from said six faces, placing together two inverted cubes to form a skybox; (b) obtaining a multiplicity of panoramic images of selected vehicles; (c) placing a specific one of said panoramic images of a selected vehicle within said skybox; (d) placing a sharing graphic user interface in said skybox that opens a socialize virtual dialog box having a socialize display text, a set up graphic user interface, and a not now graphic user interface when selected by a user; (e) said set up graphic user interface connected to a keyboard virtual dialog box with a virtual keyboard that allows the user to enter there email address to connect to a users social network account; (f) said not now graphic user interface closing said socialize virtual dialog box when selected; (g) a database that stores user names, user email addresses, upload dates, and answers to boolean queries; and (h) a to-be-shared dialog box having a to-be-shared image, an experience display text, and a custom text graphic user interface; (i) whereby, said user shares with a social media network a to-be-shared image and a comment entered into said custom text graphic user interface for other users of said social media network to view.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 7 is a screen display of a database with stored user criteria illustrating user names, uploaded dates, email addresses of users and boolean questions;

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

It is within the spirit and scope of the present invention to use similar, comparable or substitute equipment known to one skilled in the art as opposed to using the specific equipment and items set forth below. It will be appreciated that this is simply a recitation of the best method known to the inventors at the time this patent application was filed and is not intended to limit the course and scope of the specific equipment to achieve the new, novel and non-obvious results of the present invention.

The following invention will further being explained using panoramic images titled car spin panoramic images and pre-rendered computer graphic images. The car spin panoramic images are of a specific car that a user selects and the pre-rendered computer graphic images are used to create the environment, referred to as a skybox, in which the car spin panoramic images which are viewed.

The specific panoramic images used within this disclosure are panoramic images of the interior and exterior of a car. The method used in obtaining these panoramic car images is not specifically disclosed within this patent application because the method of obtaining the panoramic images is not the specific subject of this patent application but explained herein to accurately describe what is being viewed.

Similarly, the method of obtaining and generating the computer graphic images used to create the environment is not specifically disclosed, but the creation of the environment using computer graphic images is disclosed for a complete understanding of the present invention.

Figure 1:
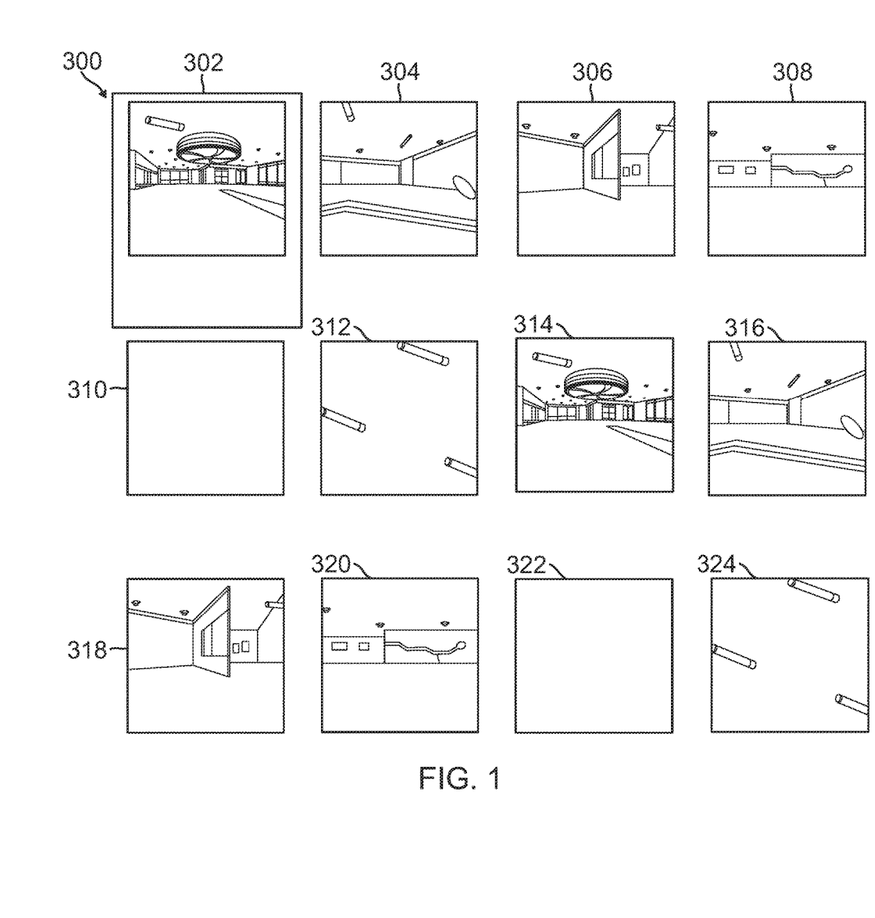
FIG. 1 is a schematic view of all the cube faces (6 left and 6 right) that form the left cube and the right cube.

Referring to FIG. 1, the computer graphic (CG) images are placed to create a 360 degree pre-rendered CG virtual environment. The images are created in an equal rectangular format, then output as six cube faces for presentation in virtual realty.

Figure 2:
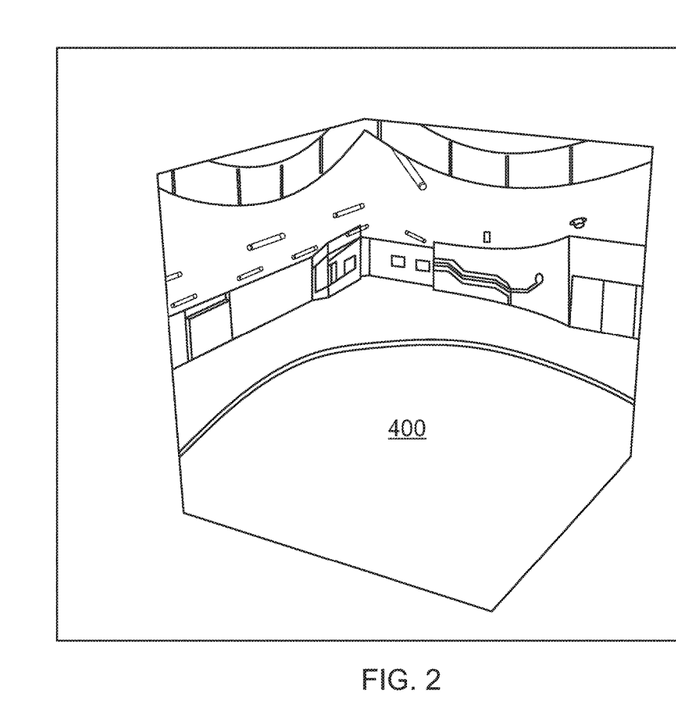
FIG. 2 is front view of either the left or right cube which forms the virtual environment or virtual showroom where the cars are viewed.

This virtual environment is created by combining 6 cube faces as shown in FIG. 1. The textures are output with the following number indexing:
0=FRONT
1=RIGHT
2=BACK
3=LEFT
4=TOP
5=BOTTOM Stereo images are differentiated by a set of left eye images and a set of right eye images. The left eye images from FIG. 1 are left front face 302, left right face 304, left back face 306, left left face 308, left top, face 310, and left bottom face 312. The eye images from FIG. 1 are right front face 314, right right face 316, right back face 318, right left face 320, right top face 322, and right bottom face 324. These images are then formed into a cube and skybox 400 (shown in FIG. 2) to create the background environment for car 230 (see FIG. 4) to be viewed. Skybox 400 is created from two inverted cubes to create the virtual showroom environment that the external panoramic images (filenames exterior spinframes) can be placed into to form a shutterbox (shown in FIG. 9).

Figure 3:
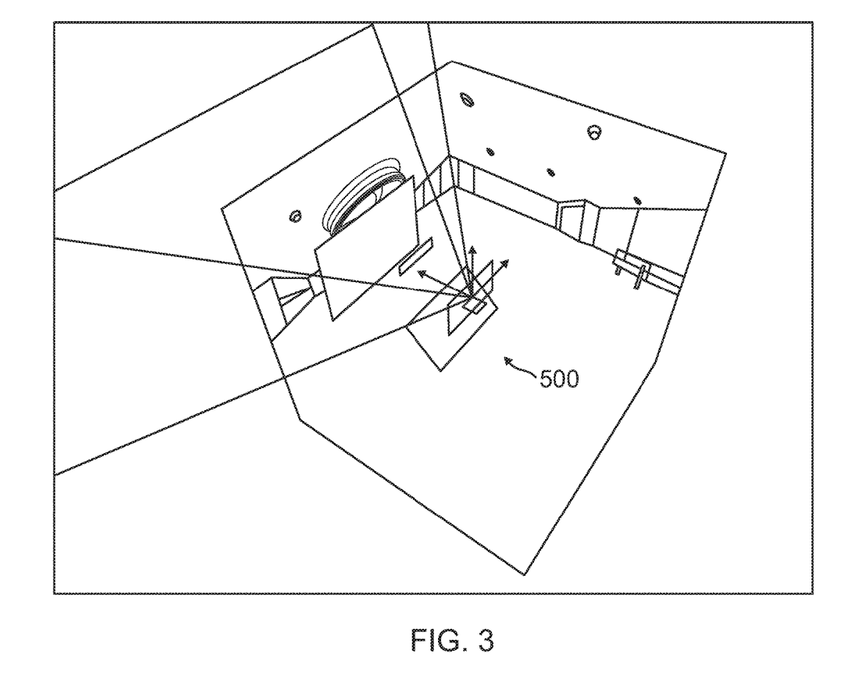
FIG. 3 is a schematic of the virtual camera illustrating that the virtual camera is positioned to aim at the center of the cube.

Once the textures are correctly set up on the cube object, a virtual realty (VR) camera object 500 (as shown in FIG. 3) is placed in the center of the cube. It is important that the VR camera is placed at a fixed point directly in the center of the cube.

Further referring to FIG. 3, the camera object 500 is a left eye camera and a right eye camera parented to a "neck" control rig, with the following setup:

Both cameras are parented to the parent "neck" control rig object.
The left eye camera has the following unique settings:
Local position to the parent is (0, −0.03, 0)
Layermask excludes the "Right" layer.
The right eye camera has the following unique settings:
Local position to the parent is (0, 0.03, 0)
Layermask excludes the "Left" layer.

Figure 4:
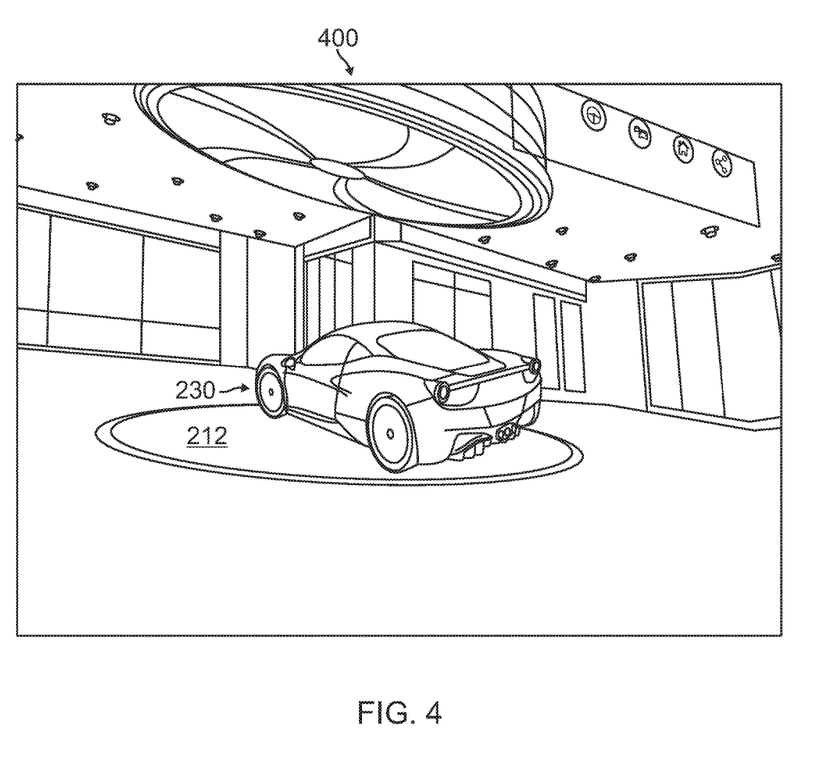
FIG. 4 is a front view of the cube/virtual environment with an external panoramic image overlayed/layered.

Referring to FIG. 4, the car spin panoramic images are placed onto the skybox 400 by having the car spin panoramic images line up with the front face of skybox 400. This ensures the images has the perfect amount of distortion and is scaled precisely on import.

Referring to FIG. 4, once the car is lined up, a special Shutterbox script is synced to an invisible rotating "anchor" object that determines the current rotation of the car. Depending on the number of images available for the spin, the Shutterbox script seamlessly switches out the appropriate left and right images depending on what angle the anchor object is currently rotated to.

Figure 5:
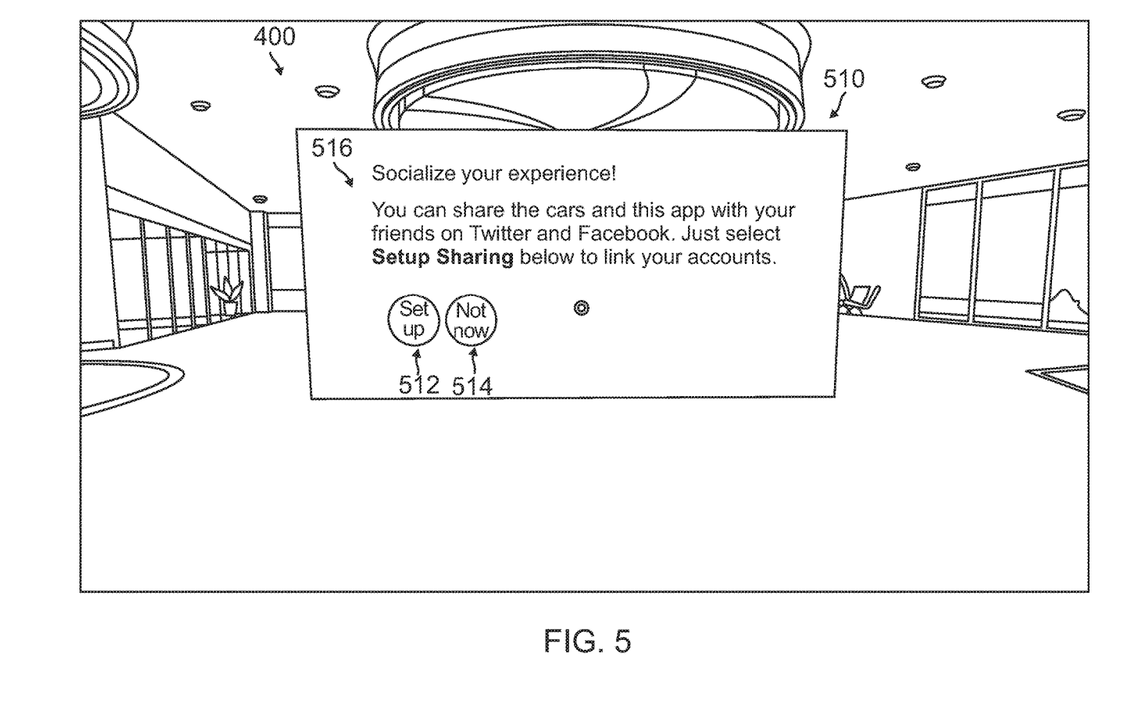
FIG. 5 is a view within a virtual reality setting created by a skybox with a virtual dialog box open having an explanation to the user that the user may share their social experience with social media with two graphic user interfaces titled "Set tip" and "Now"
Figure 6:
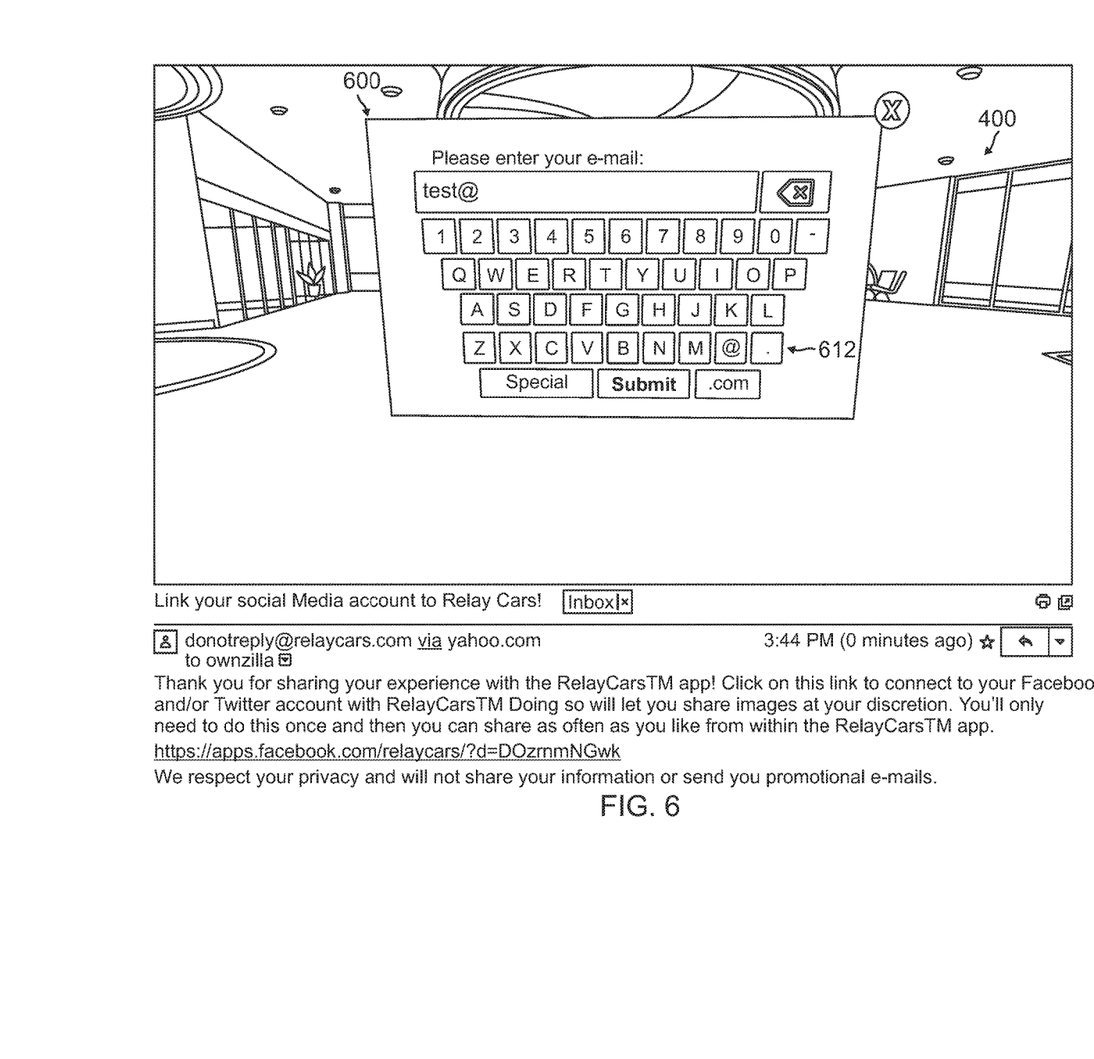
FIG. 6 is a view within a virtual reality setting created by a skybox with a virtual dialog box open that allows the user to enter their email address to connect to a user's social network.

Referring to FIGS. 5 and 6, there is illustrated a view within a virtual reality setting created by a skybox 400 with a socialize virtual dialog box 510 open having socialize display text 516 that explains to the user that the user may share their social experience with social media using two graphic user interfaces titled "Set Up" and "Not Now". When a user selects Set Up graphic user interface 512, a keyboard virtual dialog box 610 with a virtual keyboard 612 open that allows the user to enter their email address to connect to a user's social network account. If a user selects Not Now graphic user interface 514, then virtual dialog box 510 is closed and the user continues to view panoramic car spins within skybox 400.

Referring to FIG. 7, there is illustrated a screen display of a database 700 with stored user criteria illustrating in a first column user names 710, a second column read and write storage information 720. a third column and seventh column upload dates 730 and 770, a fourth column user email addresses 740 and a fifth and sixth column with answers to Boolean queries 750 and 760.

Figure 8:
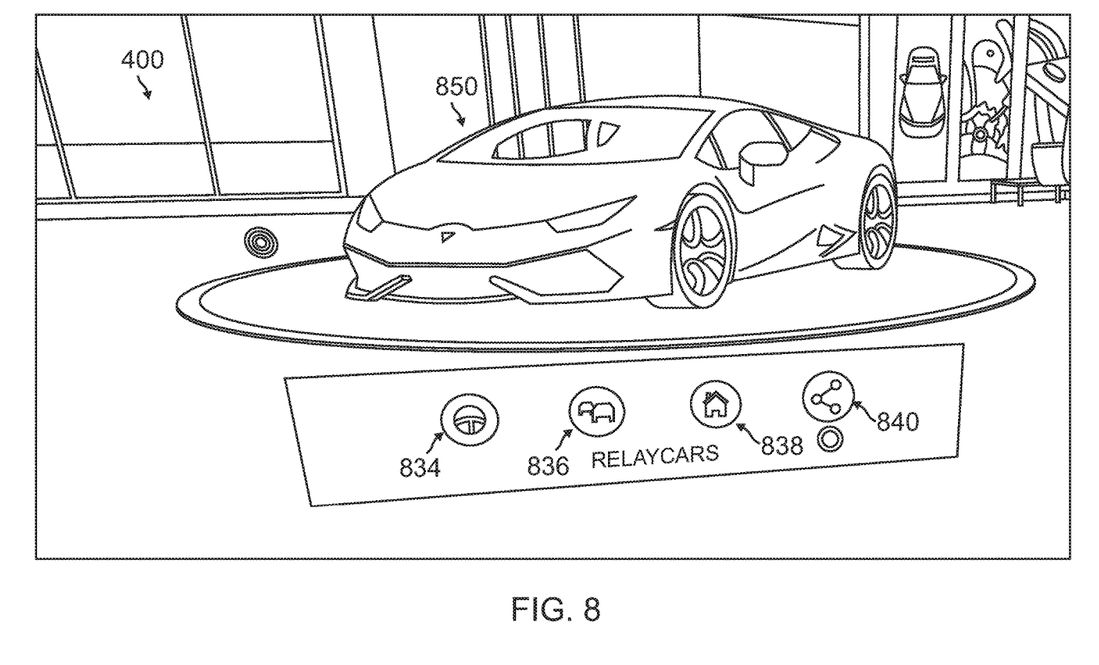
FIG. 8 is a view within a virtual reality setting created by a skybox and showing a panoramic car spin of a vehicle within the skybox with four graphic user interfaces shown below the panoramic car spin.

Referring to FIG. 8, and by way of example, superimposed graphic user interface (GUI) allows the user of the head mounted display to select the elements. In FIG. 8, there are four (4) graphic user interfaces illustrated: a steering wheel 834 which changes the view from exterior panoramic images to internal panoramic images, two cars 836 which changes the vehicle being viewed by the user, a home 838 which brings the user to the home screen within the application and a sharing graphic user interface 840 which allows the user to share an image and a comment with their social media page. Also illustrated in FIG. 8 are the surrounding skybox 400 and an external view of a panoramic car spin 850.

Figure 9:
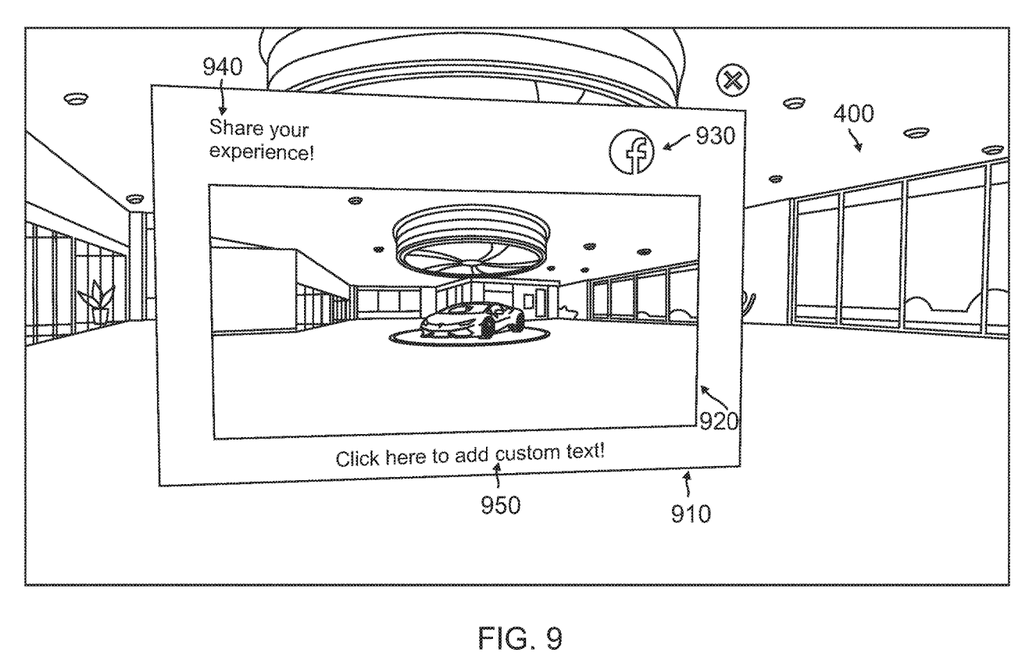
FIG. 9 is an image of the virtual reality setting in FIG. 8 without the four graphic user interfaces in FIG. 8, but having a graphic user interface to connect to Facebook® and a graphic user interface to enter a comment.

Referring to FIG. 9 there is illustrated a to-be-shared dialog box 910 having a to-be-shared image 920. Also illustrated in the to-be-shared dialog box 910, is a Facebook® graphic user interface 930, a share your experience display text 940, and a click here to add custom text graphic user interface 950. A user while wearing the head mounted display can thus share the image as shown by to-be-shared image 920 in FIG. 9 with a comment when entered into custom text graphic user interface 950. To-be-shared image 920 and custom text graphic user interface 950 will then be shared with a social network so that other users of that same social network can see the image and comment.

Some of the social networks that this image and comment can be shared with, but not limited to, are Twitter®, Facebook®, Google+®, Linkedin®, Pinetrest®, Instagram®, Flickr®, Foursquare®, Tumblr®, Flixster® and Snapchat®.

Each of the disclosed portions of the invention—the interior panoramic images, the exterior panoramic images, the virtual environment, the graphic user interface elements—are created as separate panoramic layers as a first layer, second layer, third layer, and continuing on. These panoramic layers are then brought together using gaming software such as Unity to create a final product that can be then viewed as an interactive seamless environment using a Virtual Reality Headset.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which this invention might be embodied or operated.

What is claimed is:

1. A method for displaying panoramic images in a head mounted display device, the method comprising the steps of:
   a. creating computer generated images of a virtual reality experience to form six faces of a cube and creating two identical cubes from said six faces, placing together two inverted cubes to form a skybox, wherein the skybox creates a virtual showroom for placing the panoramic images within the skybox that is presented in the head mounted display device;
   b. obtaining a multiplicity of pre-rendered panoramic images of interiors of a multiplicity of vehicles and a multiplicity of pre-rendered panoramic images of exteriors of said multiplicity of vehicles;
   c. placing a specific one of said panoramic images of a selected vehicle from either said multiplicity of panoramic images of interiors and multiplicity of panoramic images of exteriors within said skybox;
   d. placing spin panoramic images of the vehicle within said skybox by having the spin panoramic images of the vehicle line up with a front face of the skybox for rotation of the vehicle within said skybox;
   e. providing a plurality of graphic user interfaces that are superimposed on the panoramic images in said skybox displayed in the head mounted display device;
   f. displaying one of the plurality of graphic user interfaces over the specific one of said panoramic images of a selected vehicle, wherein the one of the plurality of graphic user interfaces displays a dialog box comprising at least a first button titled set up and a second button titled not now to share the user's social experience of the specific panoramic images of the vehicle with a social media;
   g. in response to user selection of the first button titled set up, displaying a keyboard virtual dialog box with a virtual keyboard that allows the user to enter email address into the keyboard virtual dialog box to connect to the user's social network account;

h. in response to user selection of the second button titled not now, closing said virtual dialog box;
i. providing one of the plurality of graphic user interfaces that displays at least a first button for changing a view from exterior panoramic images of the vehicle to interiors panoramic images of the vehicle, a second button for changing the vehicle being viewed by the user, a third button for switching to a home screen, and a fourth button for sharing an image and a comment with the user's social media network;
j. providing one of the plurality of graphic user interfaces that displays a to-be-shared dialog box having a pre-loaded to-be-shared image, an experience display text, and a custom text graphic user interface, wherein the custom text graphic user interface receives user entry of a comment into the custom text graphic user interface to share the pre-loaded to-be-shared image with the comment entered by the user so that other users of a social network can see the pre-loaded to-be-shared image with the comment entered by the user.

2. The method in accordance with claim 1, further comprising: a database that stores user names, user email addresses, upload dates, and answers to boolean queries, wherein said database is accessed by a user to determine if said user has already created a username prior to storing username within said database.

3. The method in accordance with claim 1, further comprising: said to-be-shared image is uploaded to said social media network while user is wearing said head mounted display device.

* * * * *